United States Patent Office 2,998,425
Patented Aug. 29, 1961

2,998,425
CERTAIN AMINOPYRAZOLE CARBONITRILES CONTAINING A FLUOROALKYL SUBSTITUENT
Clifford Lee Dickinson, Jr., and Blaine C. McKusick, Wilmington, Del., assignors to E. I. du Pont de Nemours and Company, Wilmington, Del., a corporation of Delaware
No Drawing. Filed Nov. 2, 1959, Ser. No. 850,059
3 Claims. (Cl. 260—310)

This invention relates to new aminopyrazoles having attached to nuclear carbon an organic radical containing a plurality of fluorine atoms.

Pyrazoles are an interesting class of compounds which have a relatively stable ring system. This ring is substantially not known to occur in natural products. No pyrazoles containing polyfluorinated substituents have heretofore been reported.

There have now been obtained new aminopyrazoles having attached to nuclear carbon a polyfluorinated monovalent radical and more particularly those which have in the fluorinated monovalent radical the —$CF_2$— group. The compounds are represented by Formula I or its isomeric Formula II:

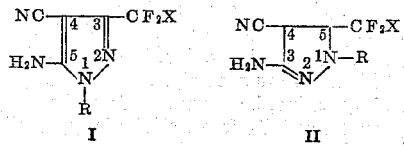

wherein X is hydrogen, fluorine, chlorine, perfluorocarbon, ω-chloroperfluorocarbon and ω-hydroperfluorocarbon, wherein said perfluorocarbons are aliphatic and are from one to six carbons; R being hydrogen, lower alkyl and $CONH_2$.

A preferred process for preparation of new compounds of this invention is by reaction of hydrazine or a monosubstituted hydrazine with a tetrasubstituted ethylene which has the polyfluoro radical and an amino group attached to one carbon and a cyano group attached to adjacent ethylenic carbon.

The ethylenic compounds particularly useful can be represented by the formula

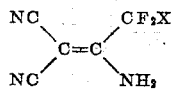

wherein X is hydrogen, fluorine, chlorine, perfluorocarbon, ω-chloroperfluorocarbon and ω-hydroperfluorocarbon, wherein said perfluorocarbons are aliphatic and of one to six carbons. These ethylenic compounds and their preparation are fully described and claimed in the copending application of Alden D. Josey and Stephen Proskow, Serial No. 849,736, filed October 30, 1959, and entitled "Chemical Products and Process."

The hydrazine compounds, that is, the other reactant in the preparation of the novel products of this invention or precursors thereof, are those that have only one substituent, i.e., have the formula $RNHNH_2$ wherein R is hydrogen or a monovalent radical. The hydrazine compounds are those which are stable and do not have groups in the monovalent radical that react with tetracyanoethylene under the reaction conditions. R in the above formula is hydrogen as in hydrazine; lower alkyl, e.g., methyl, or an acyl radical, as in hydrazides, e.g., where acyl is of carbamic acid as illustrated by semicarbazide.

Although the compounds of this invention are generally represented by Formula I, isomeric compounds of Formula II are also obtainable, and in some instances may be the major product of synthesis. That such isomers are capable of existence is not surprising in view of the literature on simple pyrazoles. Thus, Elderfield, "Heterocyclic Compounds," John Wiley, N.Y., 1957, vol. V, pages 91–92, shows similar isomers of a monosubstituted pyrazole and indicates that a mixture of isomers may result in synthetic procedures producing pyrazoles. The compounds of Formula I are named as 5-amino-3- and/or 4-substituted pyrazoles; whereas those of Formula II are 3-amino-4- and/or 5-substituted pyrazoles. The relative position of the double bonds and the nuclear nitrogen which is bonded to three different atoms are difficult to prove. For the purposes of this invention, the isomers usually have the same utility.

Since the new products of this invention or their precursors are formed by reaction of a hydrazine with the polyfluoro-containing ethylene in equimolar quantities, the two starting materials are preferably present in substantially equivalent amounts. Larger amounts of one of the reactants can be present but the molar ratio should be between 1:1.5 and 1.5:1 of the hydrazine to the ethylene.

The reaction takes place in liquid phase and an inert diluent or solvent is preferably employed. Suitable diluents or solvents are those that are nonreactive and from which the new pyrazoles can be readily separated by crystallization from the solvent or the diluent removed by vaporization. The amount of solvent is dependent upon the reactants. Suitable diluents or solvents are the lower alkanols, such as methanol, ethanol, or butanol; ethers such as dioxane; water; esters, e.g., ethyl acetate; and amides such as dimethylformamide. In general, hydroxylated solvents or diluents are preferred.

The reaction makes no unusual requirements as to temperature and time. Temperatures of 0–150° C. can be used, but it is preferred the temperature be kept below 100° C. The time is dependent upon the temperature and times of from a few minutes to several hours are generally employed.

The pyrazoles thus obtained are removed from the diluent by filtration from or evaporation of the solvent. Further purification, when necessary, can be effected through conventional crystallization techniques. The pyrazoles of our invention are crystalline compounds that are generally white in color.

The aminopyrazoles are also useful as inhibitors, e.g., in rubber, by incorporation of about 0.05% by weight of the amine. The new compounds of this invention or their derivatives have an affinity for proteinaceous material. This is further illustrated by the attachment of aldehyde derivatives of the 5-aminopyrazoles to wool to give a dyed product as shown as follows:

5-amino-4-cyano-3-trifluoromethylpyrazole (1.09 g. see Example I), 1 g. of p-dimethylaminobenzaldehyde, trace of p-toluenesulfonic acid, and 200 ml. of dioxane were refluxed for 7 hours. The solvent was removed by evaporation under reduced pressure. The oily residue dissolved in chloroform-petroleum ether and filtered to give a yellow solid. About 0.07 g. of this p-dimethylaminobenzaldehyde derivative was added to 100 ml. of water containing traces of polyvinyl alcohol and benzoic acid and 20 ml. of dioxane then introduced. Pieces of cloth were added and the dye bath heated on a steam bath for one hour. The cloths were washed with hot detergent solution for 15 minutes. Wool, nylon, and acetate were dyed a yellowish color.

An azo dye was prepared and used as follows:
Sodium nitrite (0.20 g.) was dissolved in concentrated sulfuric acid (5 ml.). At room temperature, 5-amino-4-cyano-3-trifluoromethylpyrazole (0.44 g.) was added slowly with stirring. A clear solution resulted. After 15 minutes, the solution was poured over ice. The resulting solution was added to a solution of β-naphthol (0.50 g.) in 50 ml. of 5% sodium hydroxide. Enough 2N sodium hydroxide was added to make the solution slightly basic. After 15 minutes, cold dilute sulfuric acid was added to give an orange brown precipitate of the azo dye (0.80 g.; 97%). An 0.10 g. sample of the dye was dissolved in 20 ml. of hot dioxane and added to 100 ml. of water containing traces of benzoic acid and polyvinyl alcohol. Pieces of cloth were added and the dye bath heated on a steam bath for one hour. The cloth pieces were removed and washed with a hot detergent solution for 15 minutes. Acetate fabric was dyed orange; nylon an orange-rust; and silk and wool were dye tan.

The following detailed description further illustrates new compounds of this invention and the preparation:

EXAMPLE I

*5-amino-4-cyano-3-trifluoromethylpyrazole*

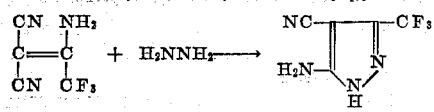

A solution of 10.4 g. (0.065 mole) of 1,1-dicyano-2-amino-3,3,3-trifluoro-1-propene and 3.5 g. (0.070 mole) of hydrazine hydrate in ethanol (250 ml.) was refluxed for 16 hours. The solvent was removed by rapid evaporation under reduced pressure to leave an oil which was heated to about 70° C. under <1 mm. pressure. Crystals (0.1 g.) sublimed out of the oil and were twice recrystallized from chloroform-petroleum ether to give white needles, M.P. 112–113° C. in a sealed capillary. The residue was crystallized from acetone-chloroform and recrystallized from the same solvent mixture to give 4.2 g. (37%) of white crystals of 5-amino-4-cyano-3-trifluoromethylpyrazole, M.P. 172° C. The infrared spectrum was in accord with the structure.

*Analysis.*—Calcd. for $C_5H_3N_4F_3$: C, 34.10; H, 1.72; N, 31.82; F, 32.37. Found: C, 34.20; H, 2.36; N, 32.26.

The 1,1-dicyano-2-amino-3,3,3-trifluoro-1-propene was prepared as follows: A suspension of 4.70 g. (0.1 mole) of a 51.2% oil dispersion of sodium hydride in 150 ml. of ethylene glycol dimethyl ether (glyme) was stirred and cooled to 15° C. while a solution of 6.6 g. (0.1 mole) of malononitrile in 25 ml. of glyme was slowly added. The temperature of the mixture was not allowed to exceed 20° C. during this addition. When the addition was complete, stirring was continued until the evolution of hydrogen ceased and the solution cleared. The solution was cooled to −10° C., and 8.5 ml. of trifluoroacetonitrile (ca. 0.1 mole) was introduced at such a rate that none was lost at the gas exit. When the addition was completed, stirring was continued one hour, and the solution cooled in an ice bath. Concentrated hydrochloric acid (ca. 10 ml.) was added until the solution was slightly acidic. After short stirring, the precipitated solid (NaCl) was removed by filtration and the filtrate evaporated to dryness. There remained 17.20 g. of crude product containing a small amount of sodium chloride. Repeated crystallization from chloroform-acetone gave colorless crystals, M.P. 179–80° C., of 1-amino-1-trifluoromethyl-2,2-dicyanoethylene.

When isocyanic acid is reacted with the new compound of Example I, there results the new carbamyl compound, 5-amino-4-cyano-3-trifluoromethyl-1-carbamylpyrazole. For many uses, the carbamyl derivatives are superior and particularly preferred.

Chlorodifluoroacetonitrile reacts with malononitrile to give 1-amino-1-chlorodifluoroacetonitrile which reacts with hydrazine to yield 5-amino-4-cyano-3-chlorodifluoromethylpyrazole.

When the general procedure of Example I is repeated except that the ethylenic compound is 1,1-dicyano-2-amino-3,3,4,5,5-pentafluoro-1,4-pentadiene (from perfluoro allyl cyanide and malononitrile), there results 5-amino-4-cyano-3-(1,1,2,3,3-pentafluoro-2-propenyl)-pyrazole.

When hydrazine is reacted with a cyanoethylene containing a polyfluorohydrocarbyl, the pyrazole resulting has hydrogen on a nuclear nitrogen. Such compounds are obtained by hydrolysis of pyrazoles containing a carbamyl on this nitrogen. Pyrazoles having no substituent on the 1-position (nuclear nitrogen) react with acylating reagents such as acyl chlorides or isocyanates to provide different derivatives of this position.

The pyrazoles as obtained above have a free primary amino group in the 5-position of the ring. Either or both of the hydrogens of this amino group are replaced by reaction of the pyrazole with an acylating or alkylating agent, including condensation with carbonyl compounds, particularly aromatic aldehydes. Thus, when 5-amino-4-cyano-3-trifluoromethylpyrazole is reacted with p-toluenesulfonyl chloride in an inert liquid diluent at a temperature of 50–100° C., there is obtained 4-cyano-3-trifluoromethyl-5-p-toluenesulfonylamino-1-p-toluenesulfonylpyrazole.

A hydrogen of the 5-amino group can likewise be replaced by an acyl group including carbamyl. Reaction of the 5-aminopyrazoles with aldehydes such as butyraldehyde, cyclohexanone, benzaldehyde, and naphthaldehyde gives the corresponding condensation products of the Schiff's base type, i.e., where the 5-amino hydrogens are replaced by an $R_4CH=$ group wherein $R_4$ is an aliphatic, cycloaliphatic, or aromatic group, preferably a hydrocarbyl group. These compounds are generally colored and can be employed as dyes. These aldehyde condensation compounds can be reduced, e.g., by hydrogen in ethanol with a platinum catalyst, to give the corresponding secondary amine, i.e., compounds of Formula I where $R_1$ is hydrogen and $R_2$ is an aliphatic, cycloaliphatic, or aromatic radical.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 5-amino-4-cyano-3-trifluoromethylpyrazole.
2. A compound of the formula

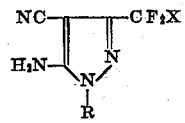

wherein R is selected from the group consisting of H, lower alkyl and —$CONH_2$; and X is selected from the group consisting of hydrogen, fluorine, chlorine, perfluorocarbon, ω-chloroperfluorocarbon and ω-hydroperfluorocarbon, wherein said perfluorocarbons are aliphatic and are from 1 to 6 carbons.

3. Process which comprises reacting an ethylene compound of the formula

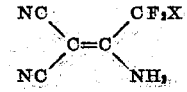

wherein X is selected from the group consisting of hydrogen, fluorine, chlorine, perfluorocarbon, ω-chloroperfluorocarbon and ω-hydroperfluorocarbon, wherein said perfluorocarbons are aliphatic and are of 1 to 6 carbons; with a hydrazine of the formula $RNHNH_2$, wherein R is selected from the group consisting of hydrogen, lower alkyl and —$CONH_2$.

References Cited in the file of this patent

UNITED STATES PATENTS 2,727,900   Shukys et al. _____ Dec. 20, 1955